US 6,574,950 B2

(12) United States Patent
Nash

(10) Patent No.: US 6,574,950 B2
(45) Date of Patent: Jun. 10, 2003

(54) THERMALLY RESPONSIVE RECUPERATOR HOUSING

(75) Inventor: James S. Nash, West Newbury, MA (US)

(73) Assignee: Ingersoll-Rand Energy Systems Corporation, Portsmouth, NH (US)

(*) Notice: Subject to any disclaimer, the term of this patent is extended or adjusted under 35 U.S.C. 154(b) by 39 days.

(21) Appl. No.: 09/968,679

(22) Filed: Oct. 1, 2001

(65) Prior Publication Data

US 2003/0061800 A1 Apr. 3, 2003

(51) Int. Cl.[7] ................................................. F02C 7/10
(52) U.S. Cl. ........................ 60/39.511; 165/4; 165/905
(58) Field of Search .................... 60/39.511; 29/890.03, 29/890.034; 165/4, 52, 81, 908, DIG. 51, DIG. 60

(56) References Cited

U.S. PATENT DOCUMENTS

| 2,974,404 | A | * | 3/1961 | Humenik | ............... 29/890.034 |
| 3,968,834 | A | | 7/1976 | Mangus et al. | |
| 4,005,573 | A | | 2/1977 | Smale | |
| 4,213,297 | A | | 7/1980 | Forster et al. | |
| 4,697,633 | A | | 10/1987 | Darragh et al. | |
| 5,050,668 | A | | 9/1991 | Peterson et al. | |
| 5,105,617 | A | | 4/1992 | Malohn | |
| 5,243,815 | A | | 9/1993 | Maier et al. | |
| 6,357,113 | B1 | * | 3/2002 | Williams | ............... 29/890.034 |

FOREIGN PATENT DOCUMENTS

EP 0 625 686 A2 5/1994

* cited by examiner

Primary Examiner—Louis J. Casaregola
(74) Attorney, Agent, or Firm—Michael Best & Friedrich LLP

(57) ABSTRACT

A microturbine system includes a compressor, a recuperator assembly, a combustor, a turbine, and a generator. The recuperator assembly includes a core that preheats compressed air provided by the compressor with exhaust gas from the turbine. The preheated compressed air is mixed with a fuel and burned in the combustor. The products of combustion are used to drive the turbine, which in turn drives the compressor and generator. The recuperator core is surrounded by a recuperator housing that is intimate with the recuperator core such that the recuperator housing assumes substantially the same temperature as the recuperator core. The recuperator housing is constructed of materials that have a coefficient of thermal expansion that is substantially equal to that of the recuperator core, and that have thicknesses substantially equal to the thickness of the recuperator core materials. A superstructure supports the recuperator core and resists expansion of the core in a stackwise direction. The superstructure includes tie rods outside of the recuperator housing, and the tie rods are substantially thermally isolated from the heat of the recuperator assembly by insulation.

20 Claims, 11 Drawing Sheets

THERMALLY RESPONSIVE RECUPERATOR HOUSING

BACKGROUND OF THE INVENTION

The invention relates generally to a recuperated microturbine system for use in power generation, and more specifically to a housing construction for the recuperator core of the microturbine system. The recuperator uses hot exhaust gases from a power turbine to heat compressed air prior to the compressed air being mixed with fuel and being burned in a combustor. Preheating the compressed air increases the efficiency of the microturbine system.

During operation, the recuperator core is exposed to large temperature excursions which cause the recuperator core to grow and shrink. One problem associated with microturbine systems is how to accommodate and selectively restrict the thermal growth of the recuperator core.

SUMMARY OF THE INVENTION

The present invention provides a recuperated microturbine engine including a recuperator core, a compressor, a turbine, a combustor, a generator, and a recuperator housing. The recuperator core includes at least one compressed air flow region and at least one exhaust gas flow region. The compressor provides compressed air to the compressed air flow region, and the turbine provides hot exhaust gas to the exhaust gas flow region to heat the compressed air in the compressed air flow region. The combustor receives the heated compressed air from the compressed air flow region, and burns the preheated compressed air with fuel to create products of combustion. The turbine communicates with the combustor and operates in response to expansion of the products of combustion. The hot exhaust gas provided by the turbine includes spent products of combustion. The generator is driven by the turbine to generate electricity.

The recuperator housing substantially encloses the recuperator core, and is intimate with the recuperator core such that the recuperator housing assumes substantially the same temperature as the recuperator core. The recuperator housing is constructed of material having substantially the same coefficient of thermal expansion and thickness as that of the recuperator core to permit the housing to thermally expand and contract at substantially the same rate as the recuperator core.

Preferably, the at least one compressed air flow region includes a plurality of compressed air flow regions defined by heat exchange cells, and the at least one exhaust gas flow region includes a plurality of exhaust gas flow regions defined between the cells. The recuperator core also preferably includes an inlet manifold communicating between the compressor and the cells, and an outlet manifold communicating between the cells and the combustor.

The recuperator housing may include manifold wrap portions, side portions, inlet and exhaust plenum portions, and top and bottom sheets. The manifold wrap portions cover the outer surfaces of the inlet and outlet manifolds of the recuperator core. The side portions frame the sides of the recuperator core around the inlets and outlets of the exhaust gas flow regions. The inlet and exhaust plenum portions are supported by the side portions. The inlet plenum portion communicates between the turbine and the inlets of the exhaust gas flow regions, and the exhaust plenum portion communicates between the outlets of the exhaust gas flow regions and a microturbine system exhaust duct. The top and bottom sheets cover the top and bottom, respectively, of the recuperator core, and are secured to the respective top and bottom edges of the side portions. The top and bottom sheets may be metallurgically bonded to the inlet and outlet manifolds of the recuperator core.

The side portions may be made integrally with the manifold wrap portions and plenum portions such that the recuperator housing includes only two side pieces that are joined at only two seams around the sides of the recuperator core. The top and bottom sheets are then fastened to the top and bottom edges of those two side pieces. Alternatively, any one or more of the side portions, manifold wrap portions, and plenum portions can be made separately from the other portions, such that the portions are fastened together around the recuperator core at more than two seams.

An exoskeleton or superstructure may be provided around the recuperator core and outside of the recuperator housing. The superstructure may include top and bottom plates above the top sheet and below the bottom sheet, respectively. Tie rods may be interconnected between the top and bottom plates outside of and spaced from the recuperator housing. Because the tie rods are outside of the recuperator housing, the tie rods are not exposed to the same heat cycles as the recuperator core and the intimate recuperator housing. Additionally, the tie rods may be manufactured of material having a lower coefficient of thermal expansion than that of the recuperator core and housing. The superstructure therefore restricts expansion of the recuperator core and housing in the stackwise direction.

Other features and advantages of the invention will become apparent to those skilled in the art upon review of the following detailed description, claims, and drawings.

DETAILED DESCRIPTION OF THE PREFERRED EMBODIMENTS

Figure 1:
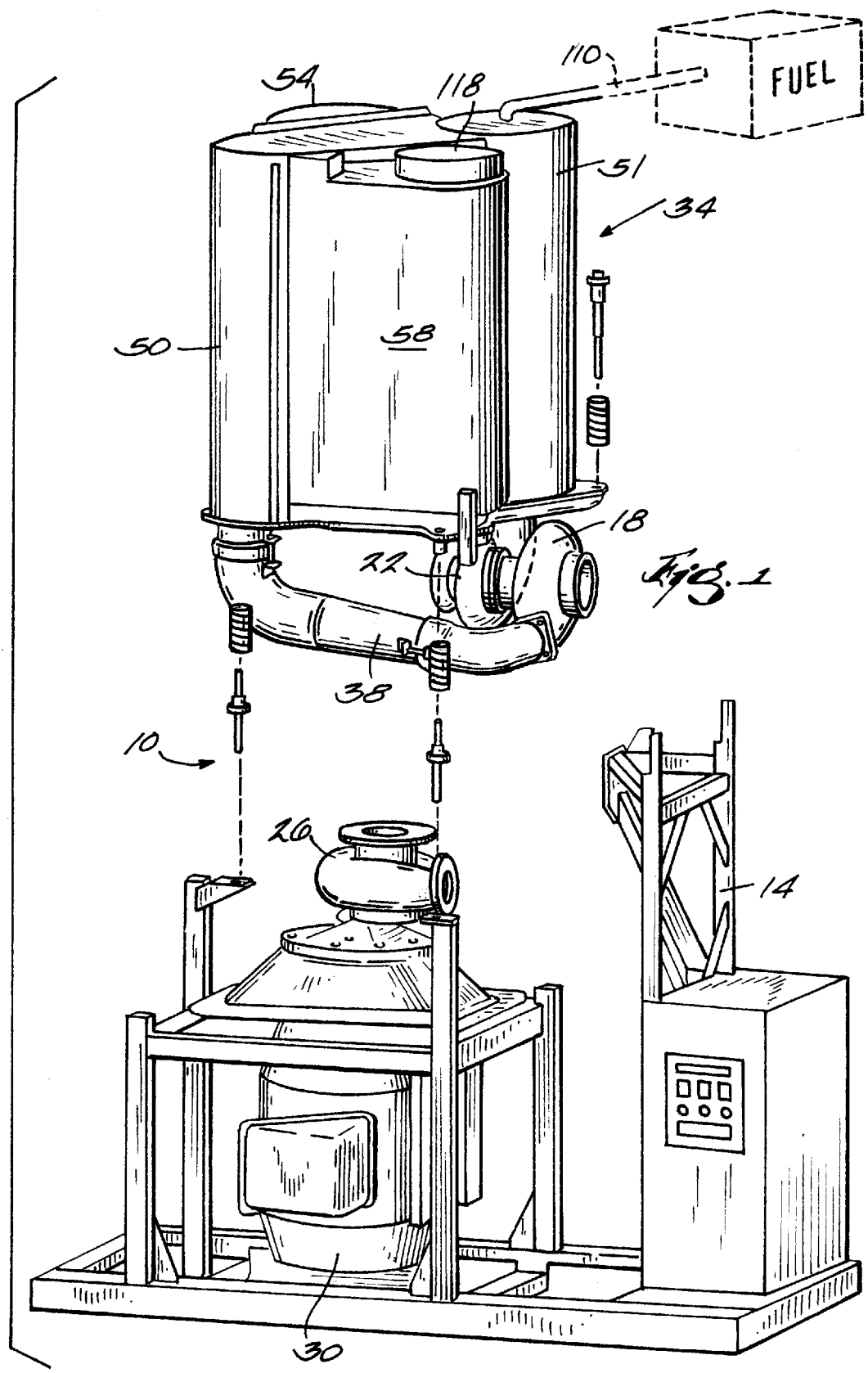
FIG. 1 is an exploded view of a microturbine system embodying the invention.

FIG. 1 illustrates a microturbine system 10 that includes a frame 14 which supports a compressor 18, a first or gasifier turbine 22, a second or power turbine 26, a generator 30, and a recuperator assembly 34. Alternatively, the turbines 22, 26 could be replaced with a single turbine. The compressor 18, generator 30, and turbines 22, 26 each have rotating elements. The first and second turbines 22, 26 are interconnected with the compressor 18 and generator 30, respectively, and cause rotation of the rotating elements of those elements during operation of the microturbine system 10. In response to rotation of their rotating elements, the generator 30 generates electricity for use outside the system 10, and the compressor 18 compresses air that is delivered to the recuperator assembly 34 through a compressor duct 38.

Figure 2:
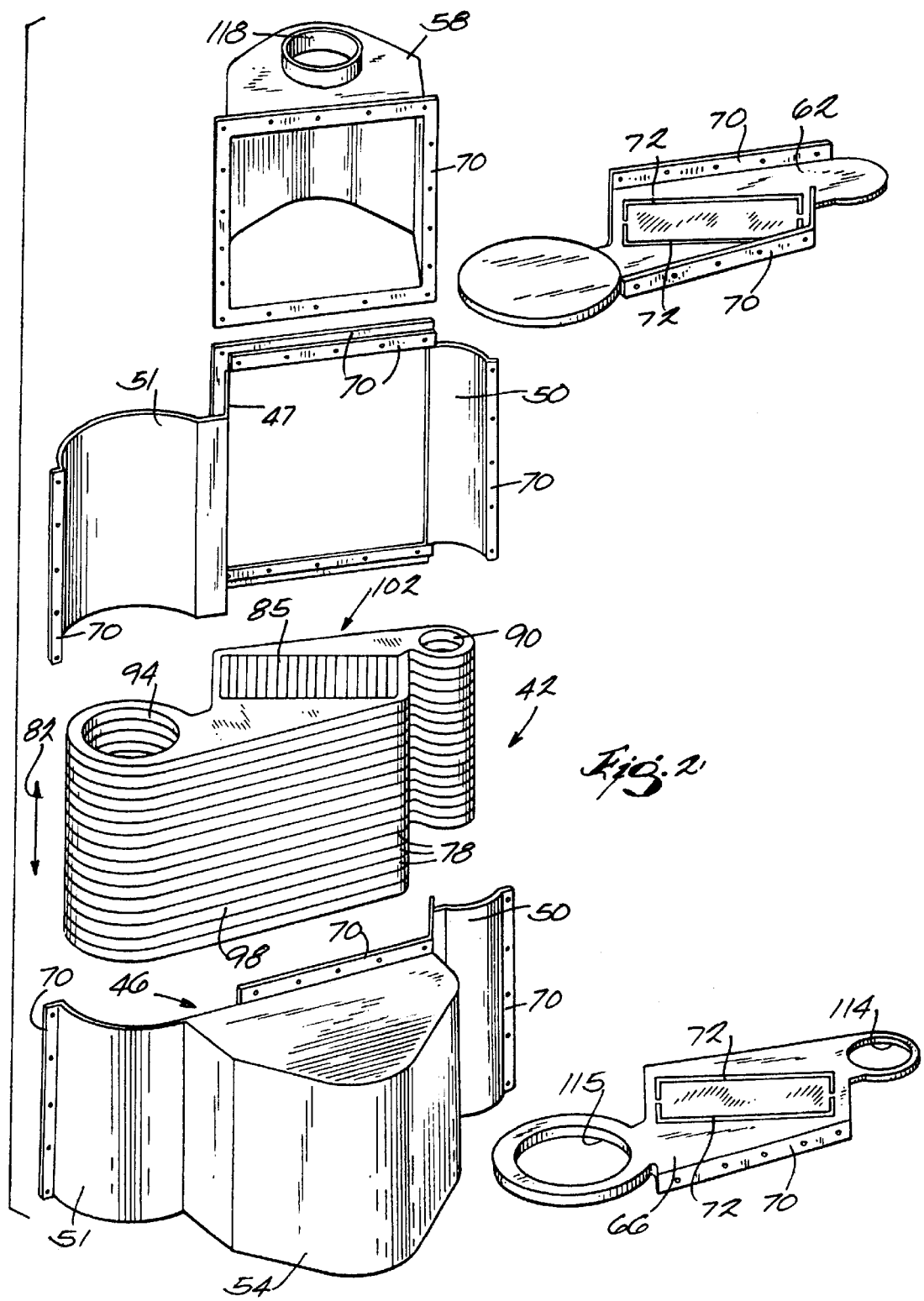
FIG. 2 is an exploded view showing a first construction of a recuperator housing used in the microturbine system.
Figure 3:
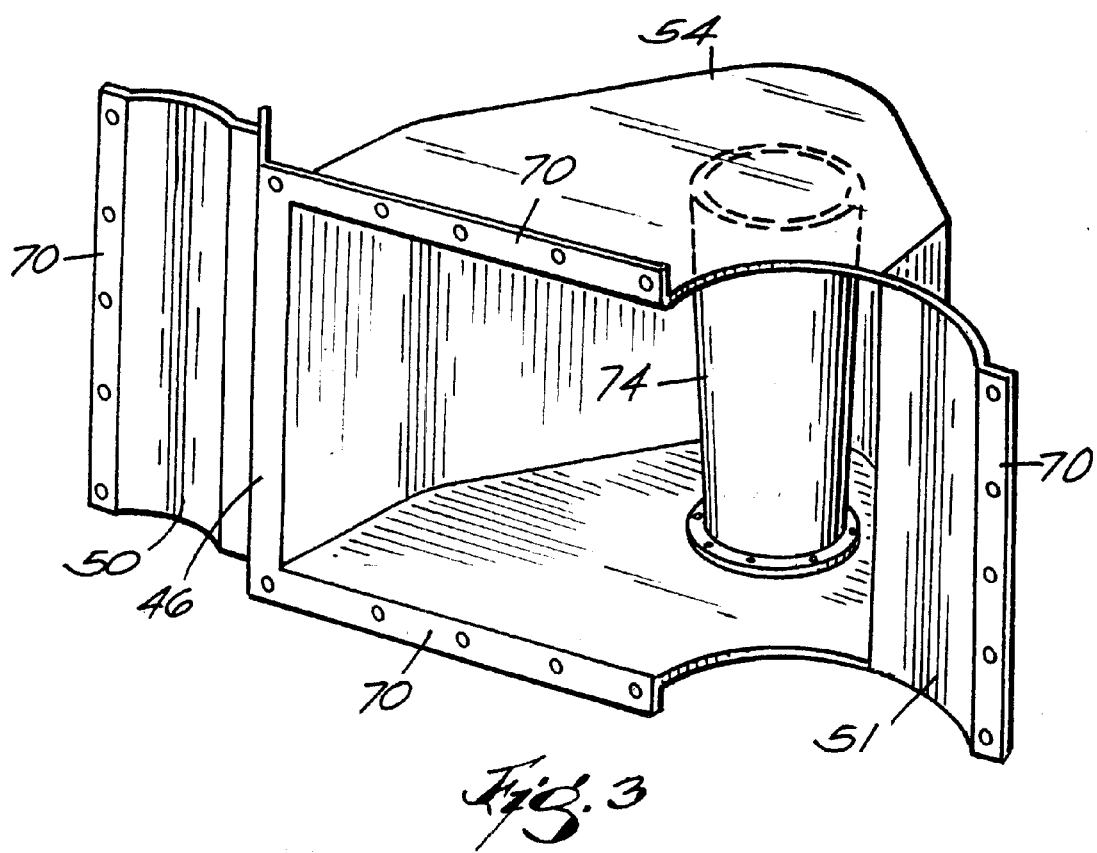
FIG. 3 is a perspective view of the a portion of the recuperator housing.
Figure 4:
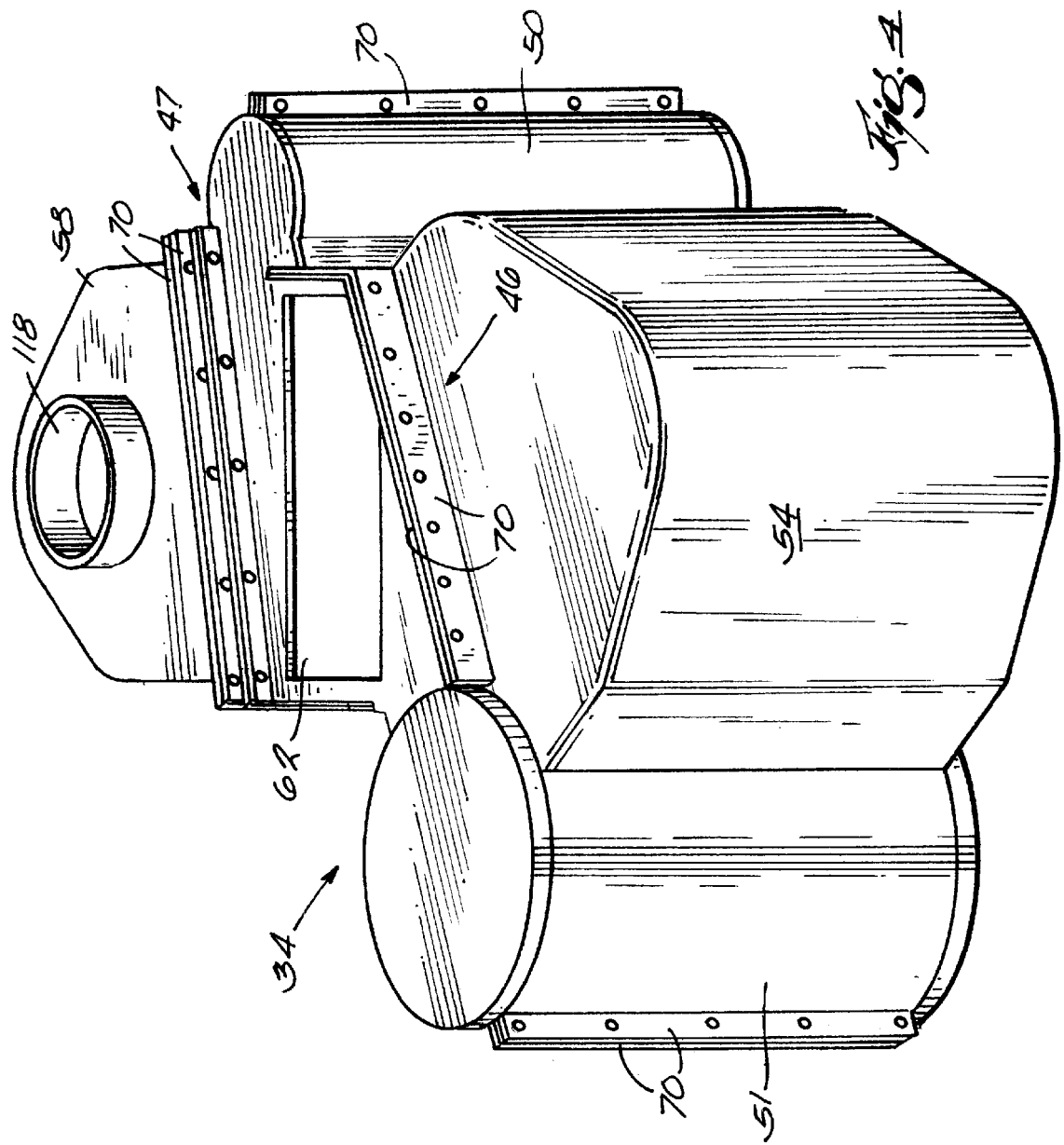
FIG. 4 is a perspective view of the recuperator housing of FIG. 2 in an assembled condition.

Turning to FIGS. 2–4, the recuperator assembly 34 includes a housing that surrounds a recuperator core 42. The housing includes a gas inlet side portion 46, a gas outlet side portion 47, an inlet manifold wrap portion 50, an outlet manifold wrap portion 51, inlet and exhaust plenum portions 54, 58, and top and bottom sheets 62, 66. Flanges 70 are provided on the various portions to facilitate assembling the housing. The top and bottom sheets 62, 66 each include stress-relieving kerfs or cuts 72 (greatly exaggerated in size in the drawings for the purposes of illustration) that help the top and bottom sheets 62, 66 accommodate thermal strain during operation of the system 10.

In the illustrated construction, each of the side portions 46, 47 is integrally formed with a part of the manifold wrap portions 50, 51. The manifold wrap portions 50, 51 are therefore each in two parts. As used herein, "integrally formed with" means the elements are made as one part or are made separately and then permanently joined (e.g., as by welding or brazing). Also, the inlet plenum portion 54 is integrally formed with the gas inlet side portion 46. The outlet plenum portion 58 is separate from the gas outlet side portion 47, and is removably mounted thereto with bolts or other suitable fasteners. The inlet plenum 54 includes a diffuser 74 therein. Positioning the diffuser 74 in the inlet plenum 54 creates space savings for the overall microturbine system 10.

The illustrated housing therefore includes first and second side pieces. The first side piece includes the gas inlet side portion 46, the inlet plenum 54, and parts of the inlet and outlet manifold wrap portions 50, 51, as illustrated. The second side piece includes the gas outlet side portion 47 and parts of the inlet and outlet manifold wrap portions 50, 51, as illustrated.

Figure 6:
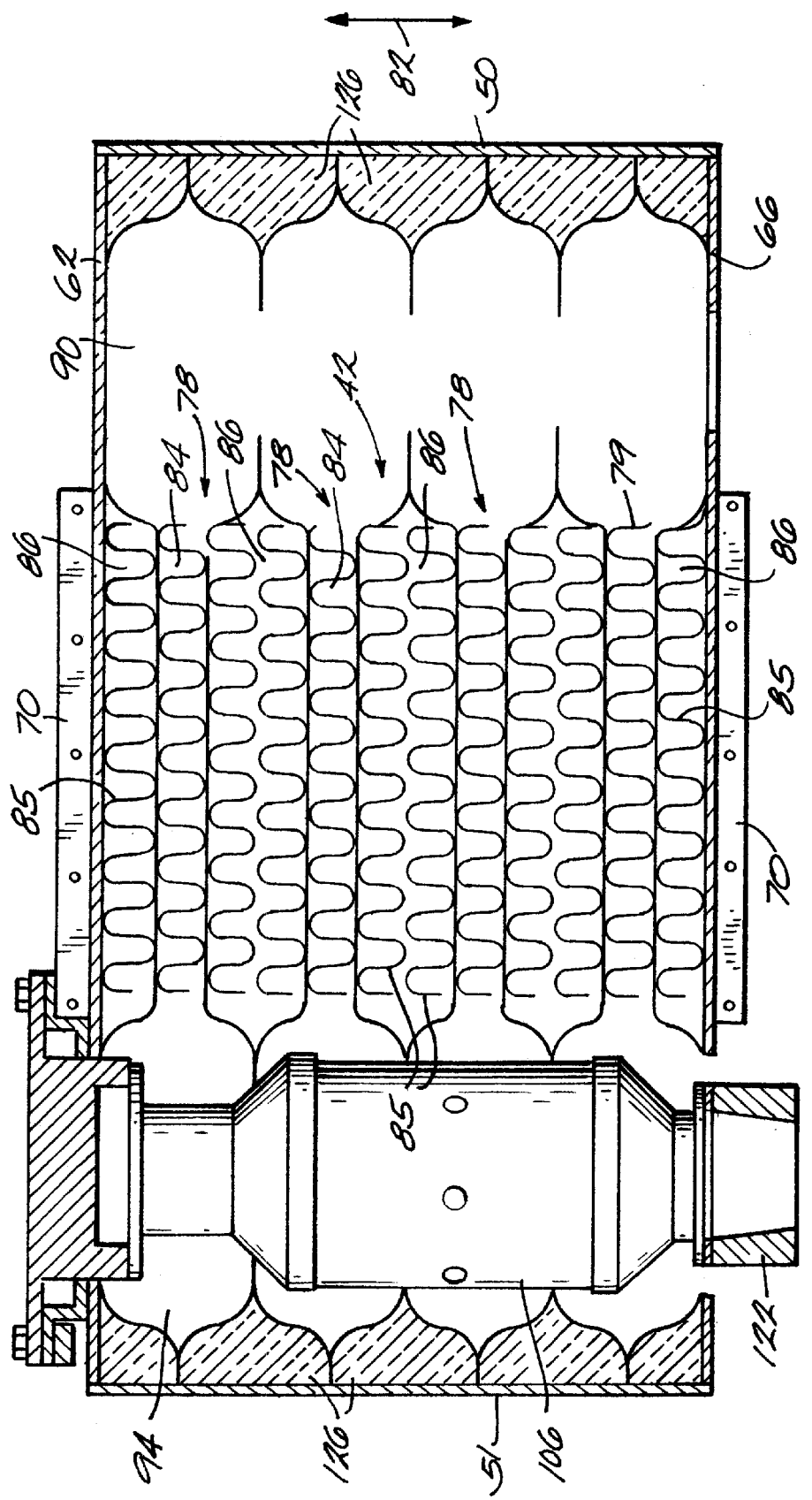
FIG. 6 is another section view of the recuperator housing and core.

With reference to FIGS. 2 and 6, the recuperator core 42 includes a plurality of cells 78 stacked in a stackwise direction 82. It should be appreciated that the size of the cells 78 in FIG. 6 is greatly exaggerated for the purpose of illustration, and that the recuperator core 42 is not drawn to scale. In reality the cells 78 are much thinner, and there are many more cells 78 stacked in the recuperator cell 42 than illustrated. The cells 78 include matrix fins 79 that define compressed air flow regions 84. External matrix fins 85 are attached to the top and bottom of the cells 78 and define a plurality of hot exhaust gas flow regions 86 between the cells 78. The sheets that make up the cells 78 of the recuperator core 42 are substantially the same thickness as the material that makes up the portions 46, 47, 50, 51, 54, 58, 62, 66, 70 of the recuperator housing.

Figure 5:
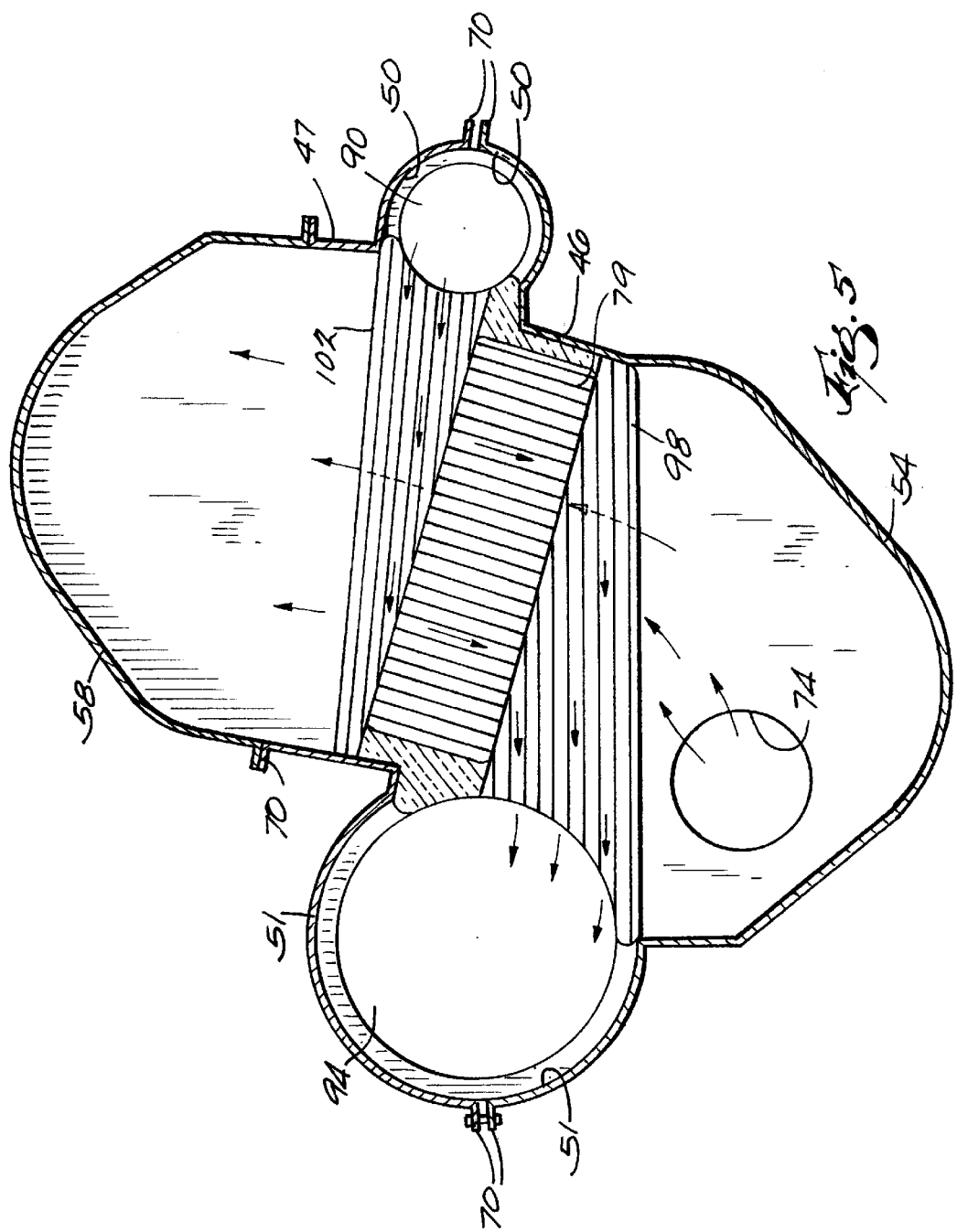
FIG. 5 is a section view of the recuperator housing and core.

Although the recuperator core 42 may be substantially any gas-to-gas counterflow or crossflow heat exchanger, the illustrated recuperator core 42 is a plate-fin type counterflow heat exchanger. The recuperator core 42 also includes inlet and outlet manifolds 90, 94. The exhaust gas flow regions 86 include inlet and outlet ends in respective gas inlet and gas outlet sides 98, 102 (see also FIG. 5) of the recuperator core 42. The stacked cells 78 are preferably metallurgically bonded to each other (e.g., by welding) only at the manifolds 90, 94 to create a compliant bellows type of manifold that can elastically accommodate thermal deflections. Preferably, a combustor 106 is mounted within or is otherwise in communication with the outlet manifold 94 of the recuperator core 42. Fuel lines 110 (shown in FIG. 1) communicate with the combustor 106 for the provision of fuel thereto.

The top and bottom sheets 62, 66 are preferably metallurgically bonded (e.g., by welding) to the respective uppermost and bottom heat exchange cells 78 at the manifolds 90, 94. The top and bottom exhaust gas flow regions 86 are defined between the top and bottom cells 78 of the recuperator core 42 and the top and bottom sheets 62, 66. The top and bottom heat exchange fins 85 on the top and bottom cells are trapped between the top and bottom sheets 62, 66 and the top and bottom cells 78, within the top and bottom exhaust gas flow regions 86. The top and bottom sheets 62, 66 are preferably in contact with the fins 85.

The bottom sheet 66 includes inlet and outlet apertures 114, 115 positioned under the inlet and outlet manifolds 90, 94, respectively. The top sheet 62 does not include such apertures, and closes the top end of the manifolds 90, 94. The illustrated construction is therefore suited for communicating with the bottom ends of the manifolds 90, 94. It is to be understood that the invention is not limited to the illustrated construction, and may be used in systems that communicate with the top of either or both of the manifolds 90, 94, and that apertures 114, 115 may be provided in the top sheet 62 as suitable for a given system.

The assembled recuperator assembly 34 is illustrated FIG. 4. The inlet manifold wrap portions 50 are secured to each other and the outlet manifold portions 51 are secured to each other along their respective flanges 70. The top and bottom sheets 62, 66 are secured to flanges 70 along the top and bottom edges, respectively, of the gas inlet and outlet side portions 46, 47. The seams or joints defined by the joined flanges 70 provide substantially airtight seals. In addition, gaskets may be employed in the flange joints to improve the seal or a metal to metal seal may be used.

The gas inlet and outlet side portions 46, 47 manifold wrap portions 50, 51, and top and bottom sheets 62, 66 are in intimate contact with the recuperator core 42. As used herein, "intimate contact" means that one element is actually touching the other element or is close enough to the other element to assume substantially the same temperature as the other element. More specifically, the side portions 46, 47 and manifold wrap portions 50, 51 are in intimate contact with the edges of the cells 78. As described above, the top and bottom sheets 62, 66 contact the top and bottom heat transfer fins 85 of the recuperator core 42 and are welded to the inlet and outlet manifolds 90, 94. The side portions 46, 47 generally frame the gas inlet and gas outlet sides 98, 102 of the recuperator core 42 and support the plenum portions 54, 58 next to the recuperator core 42.

Figure 7:
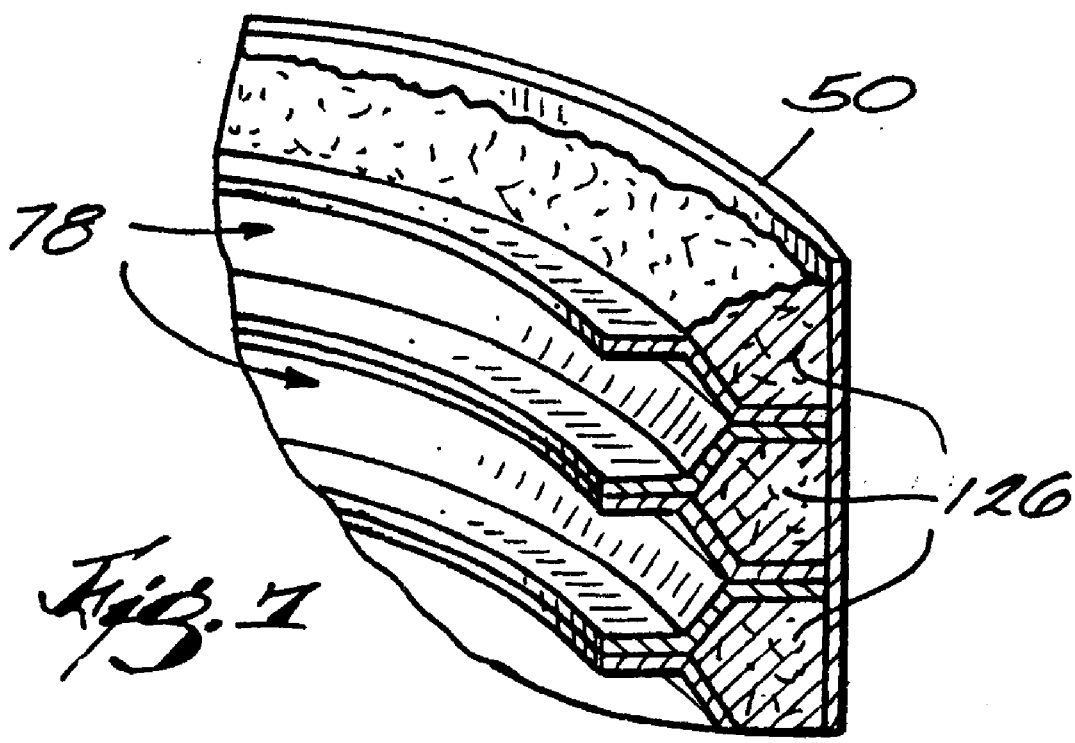
FIG. 7 is a perspective view of a portion of the inlet manifold.

The side portions 46, 47 are capable of providing only a partial seal around the manifolds 90, 94. To complete the seal around the manifolds 90, 94, ceramic rope insulation 126 (FIGS. 6 and 7) is placed in the spaces between the stacked heat exchange cells 78. This type of insulation is advantageous for this application because it does not degrade when exposed to the high temperatures associated with the recuperator core 42.

In operation, the compressor 18 provides compressed air to the inlet manifold 90 through the compressor duct 38, and the compressed air flows into the cells 78 of the recuperator core 42. At the same time, hot exhaust gas flows from the power turbine 26 into the diffuser 74 in the inlet plenum portion 54. The flow velocity of the exhaust gas is reduced in the diffuser 74, which results in a substantially even distribution of exhaust gas into the inlet end of the exhaust gas flow regions 86 of the recuperator core 42. The exhaust gas and compressed air are in generally counterflowing relationship with respect to each other (see arrows in FIG. 5), and the compressed air is heated by the exhaust gas.

The exhaust gas flows out of the exhaust gas flow regions 86 and into the exhaust plenum portion 58 on the gas exhaust side 102 of the core 42. The exhaust gas then enters an exhaust duct 118 (FIGS. 1, 2, and 4) and is vented from the microturbine system 10. The preheated air flows out of the cells 78 and into the outlet manifold 94, where it is mixed with fuel and enters the combustor 106 (FIG. 6). The combustor 106 burns the air/fuel mixture and creates products of combustion, which flow out of a nozzle 122 on the combustor 106 and into the first turbine 22. Preheating the compressed air reduces the fuel flow needed to achieve a firing temperature, which improves the efficiency of the combustor 106.

The flow of products of combustion causes the first turbine's rotational element to rotate, and drives the compressor 18. The first turbine 22 is preferably a radial inflow turbine. The products of combustion then flow from the first turbine 22 to the second turbine 26, which is also preferably a radial inflow turbine. The expansion of products of combustion through the turbine exerts torque on the rotational element of the second turbine 26, thereby causing the rotational element to rotate. The second turbine 26 in turn operates the generator 30. The products of combustion exit the second turbine 26 as exhaust gases, and flow into the gas inlet plenum 54 through the diffuser 74. The exhaust gases then flow into the exhaust gas flow regions 86 to preheat the compressed air, as described above.

During operation of the system 10, the recuperator core 42 is exposed to large temperature gradients and high temperatures. The temperature gradients and high temperatures cause thermal loading on the core 42 that cases the core 42 to expand and deflect. Because the recuperator housing is intimate with the recuperator core 42, the recuperator housing will assume substantially the same temperature as the recuperator core 42. The recuperator housing and recuperator core 42 are preferably constructed of the same materials or materials having similar coefficients of thermal expansion. For example, the recuperator core 42 and housing may both be made of austenitic stainless steel.

Figure 8:
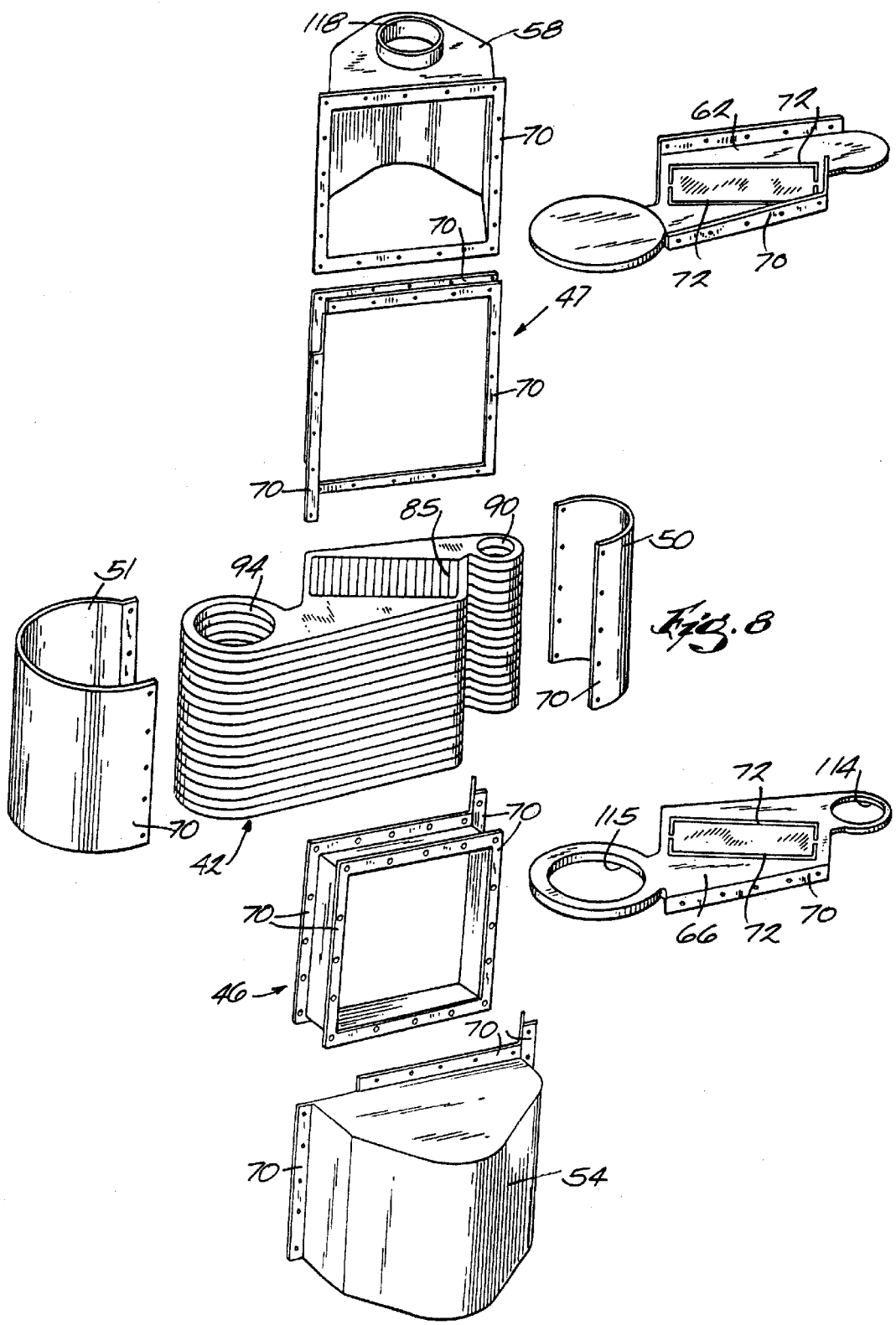
FIG. 8 is an exploded view of a second construction of the recuperator housing.

FIG. 8 illustrates a second construction of the recuperator housing. The same reference numerals are used to identify elements similar to those in FIGS. 1–7. In this construction, the manifold wrap portions 50, 51, the gas inlet and outlet side portions 46, 47, and the plenum portions 54, 58 are made separately from each other, and are joined together by fastening the flanges 70 of the parts together. The top and bottom sheets 62, 66 are substantially the same as discussed above with respect to the first construction.

Figure 9:
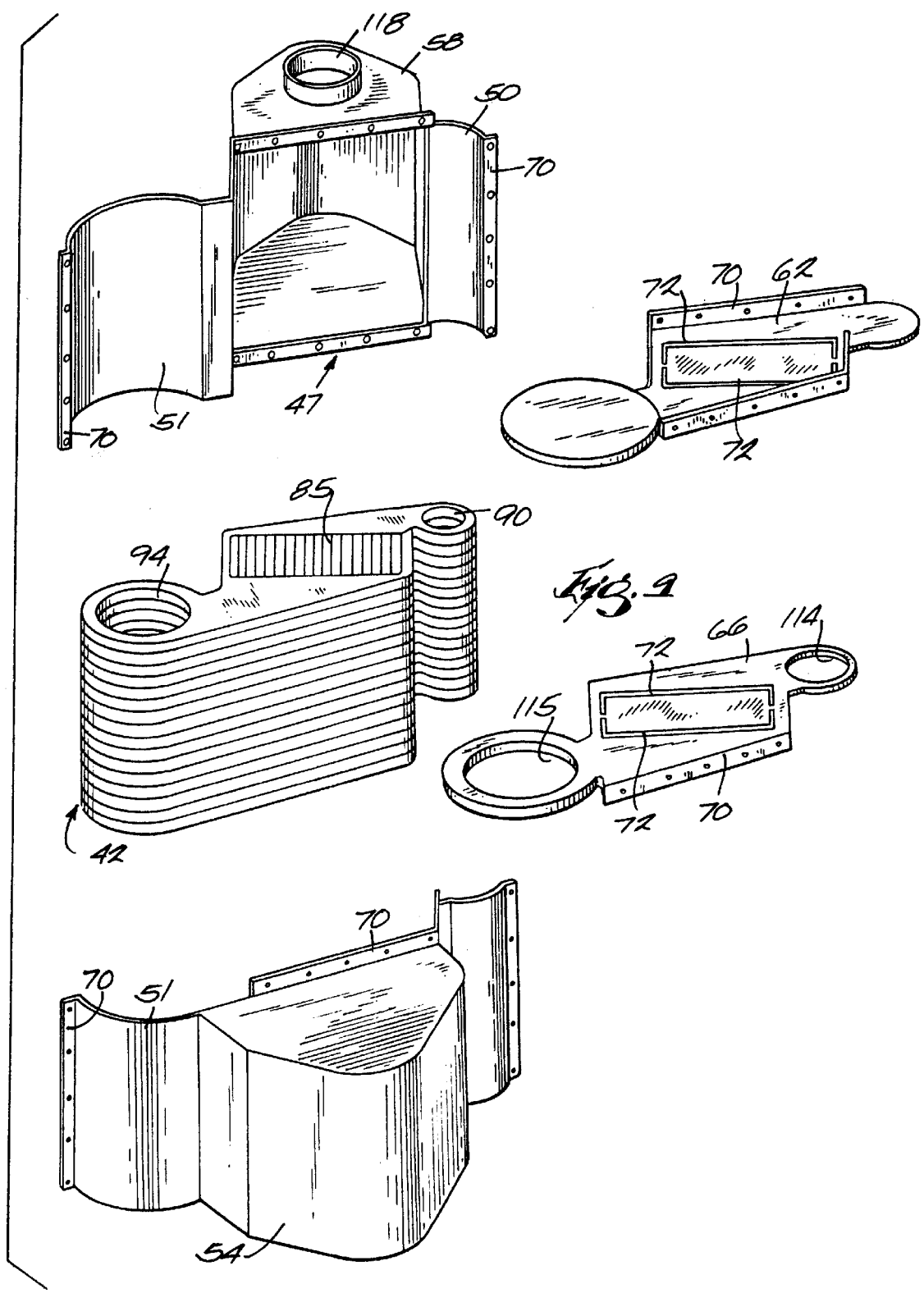
FIG. 9 is an exploded view of a third construction of the recuperator housing.

FIG. 9 illustrates a third construction of the recuperator housing. The same reference numerals are used to identify elements similar to those in FIGS. 1–7. In this construction, the outlet plenum portion 58 is integrally formed with the gas outlet side portion 47. The top and bottom sheets 62, 66 are substantially the same as set forth above. In this construction, the two side pieces each include portions of the manifold wrap portions 50, 51, the respective gas inlet and outlet side portions 46, 47, and the respective manifold portions 54, 58.

Figure 10:
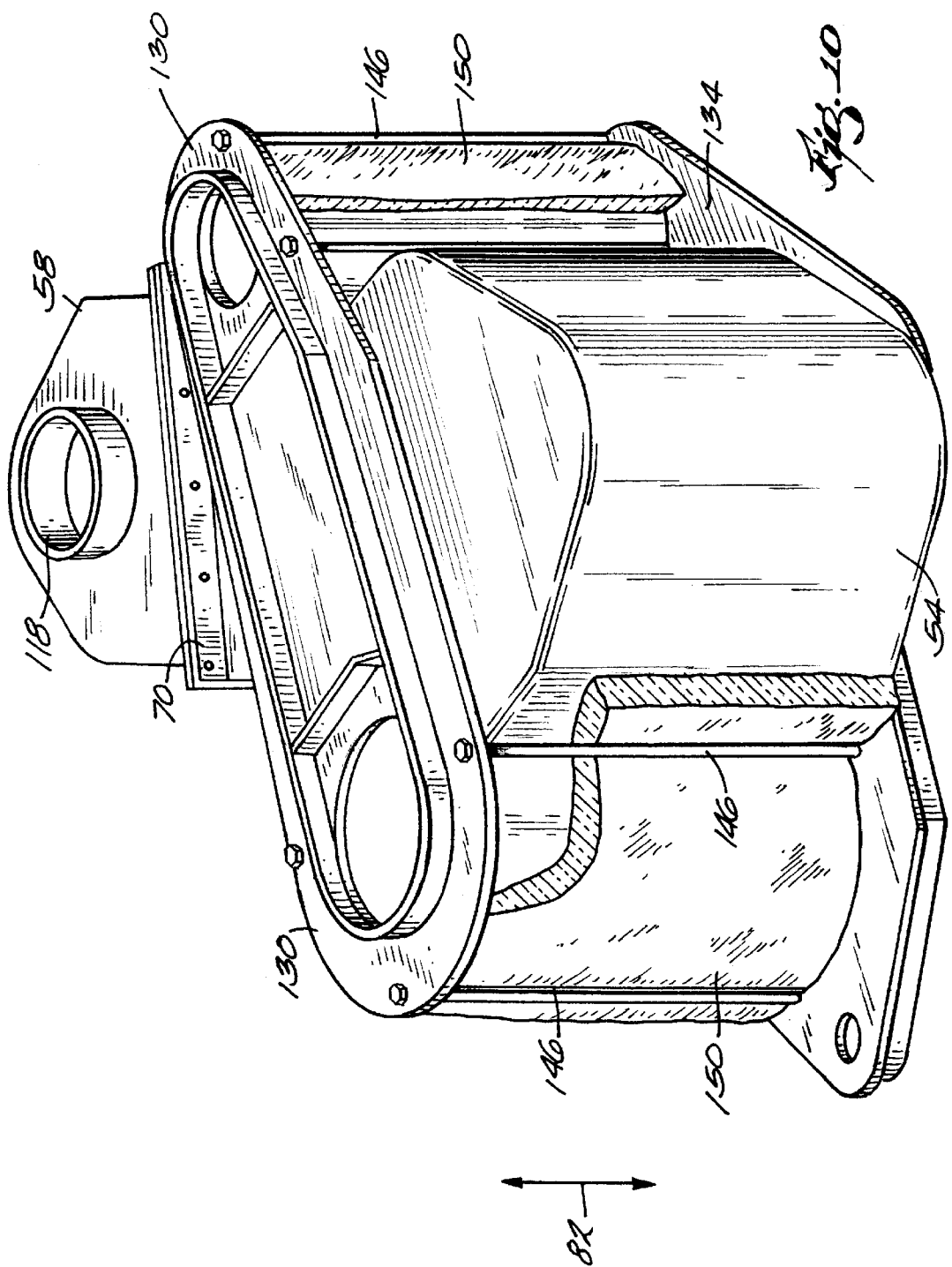
FIG. 10 is a perspective view of a recuperator support structure.
Figure 11:
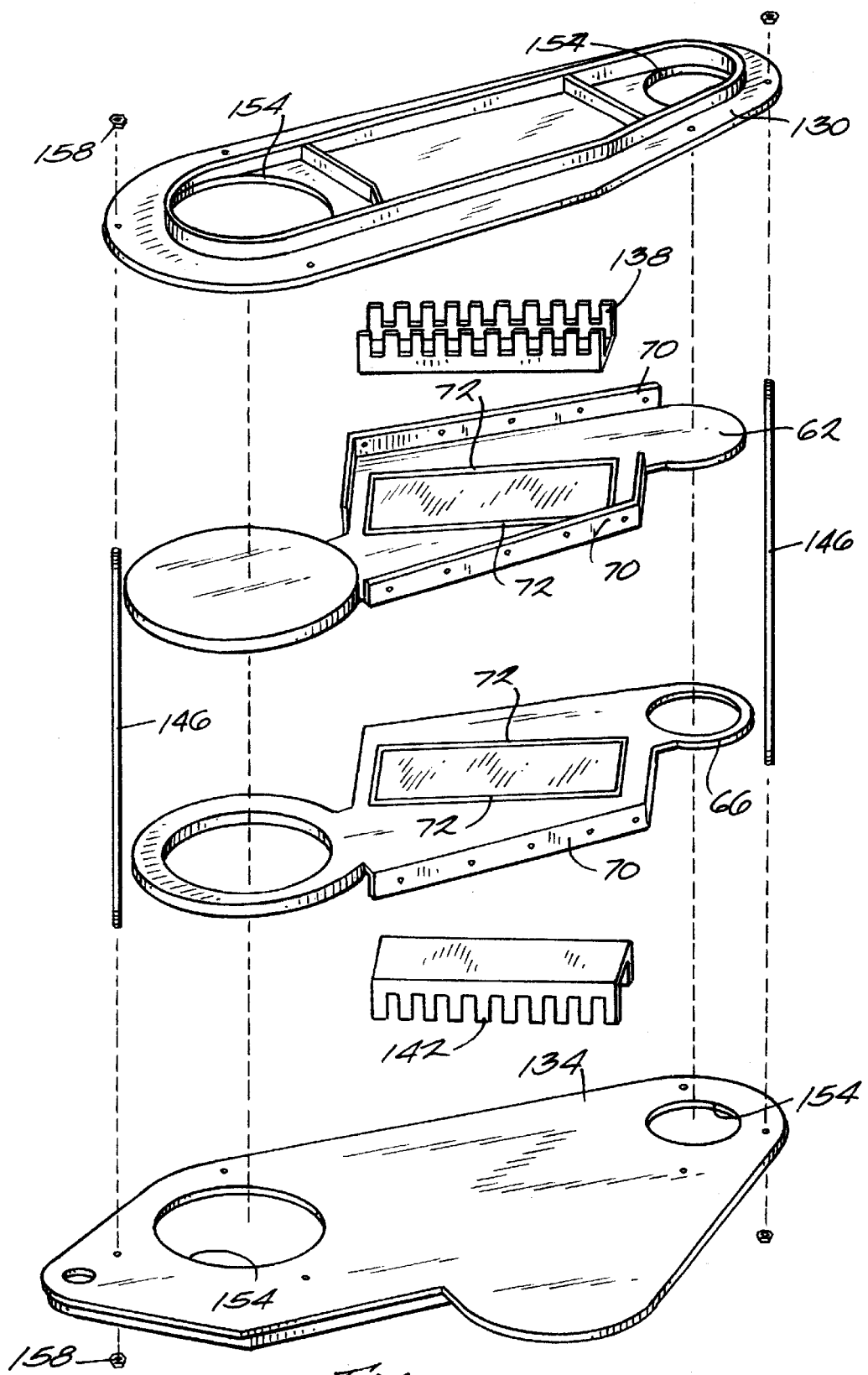
FIG. 11 is an exploded view of the support structure.

FIGS. 10 and 11 illustrate an exoskeleton structure, superstructure, or support structure that is used with the recuperator assembly 34, regardless of which of the above-described constructions is employed. The exoskeleton includes a top plate 130, a bottom plate 134, a top standoff 138, a bottom standoff 142, a plurality of tie rods 146, and insulation 150. The top and bottom plates 130, 134 are above and below the top and bottom sheets 62, 66, respectively, and cover the flanges 70 of the top and bottom sheets 62, 66. The top and bottom standoffs 138, 142 are generally "U" shaped components having a substantially flat surface spaced from the top and bottom plates 130, 134. The standoffs 138, 142 are sized and positioned such that when the exoskeleton is assembled they contact the top and bottom sheets 62, 66, and cover and substantially seal the kerfs 72 in the top and bottom sheets 62, 66. The standoffs 138, 142 relieve or prevent distortion due to temperature differences between the top and bottom sheets 62, 66 and the end plate 130, 134 contact surfaces.

The top and bottom plates 130, 134 are thicker than the top and bottom sheets 62, 66, and are constructed of plate steel or other suitable material. The plates 130, 134 include holes or apertures 154 to accommodate various ducts or other components (e.g., fuel lines). Because the plates 130, 134 themselves provide no sealing function, the size and location of the holes 154 is not critical.

The tie rods 146 are used to hold the top plate 130 and the bottom plate 134 a fixed distance apart. The tie rods 146 are preferably spaced from the recuperator housing at least 0.5 inches. The tie rods 146 are made of steel or other material capable of sustaining a high tensile load. Nuts, bolts, screws or other fastening elements 158 are used to attach the tie rods 146 to the plates 130, 134. The fastening elements 158 are tightened during installation to impart a compressive load on the recuperator assembly 34 through the top and bottom plates 130, 134 and the standoffs 138, 142.

During operation, the recuperator core 42 and housing heat up substantially. The increase in temperature causes thermal expansion of the core 42 and housing in all directions. The insulation 150 shields the tie rods 146 from the heat of the recuperator assembly 34 during operation, or at least reduces the temperatures to which the tie rods 146 are exposed. The tie rods 146 therefore do not yield or deform to any significant extent, even as the recuperator assembly 34 is expanding. The standoffs 138, 142 cover and seal the kerfs 72, and the expansion of the recuperator assembly 34 only increases the compressive force between the standoffs 138, 142 and the core 42. The compressive force applied to the core 42 by the superstructure is approximately proportional to the temperature difference between the core 42 and the tie rods 146. Therefore, when the core 42 is at its highest temperature, the compressive force applied by the superstructure is at its maximum. The support structure therefore resists recuperator core 42 growth in the stackwise direction 82, and keeps the cells 78 of the recuperator core 42 close to each other during operation of the system 10 to maximize efficiency of the core 42.

Although particular embodiments of the present invention have been shown and described, other alternative embodiments will be apparent to those skilled in the art and are within the intended scope of the present invention. Thus, the present invention is to be limited only by the following claims.

What is claimed is:

1. A recuperated microturbine engine comprising:
   a recuperator core including at least one compressed air flow region and at least one exhaust gas flow region;
   a compressor providing compressed air to said compressed air flow region;

a turbine providing hot exhaust gas to said exhaust gas flow region to heat the recuperator core and the compressed air in said compressed air flow region;

a combustor receiving the heated compressed air from said compressed air flow region and burning the preheated compressed air with a fuel to create products of combustion, wherein said turbine communicates with said combustor and operates in response to expansion of the products of combustion, and wherein said products of combustion exit said turbine as the hot exhaust gas;

a generator driven in response to operation of said turbine to generate electricity;

a recuperator housing substantially enclosing said recuperator core, said recuperator housing being intimate with said recuperator core such that said recuperator housing assumes substantially the same temperature as said recuperator core, wherein said recuperator housing is constructed of material having substantially the same coefficient of thermal expansion and similar thickness as that of the recuperator core to permit said recuperator housing to thermally expand and contract at substantially the same rate as said recuperator core; and a tie rod connected to the recuperator housing and operable to apply a compressive force to the recuperator core, the compressive force varying with the recuperator core temperature.

2. The engine of claim 1, wherein said at least one compressed air flow region includes a plurality of compressed air flow regions defined by heat exchange cells, wherein said at least one exhaust gas flow region includes a plurality of exhaust gas flow regions defined between said cells, wherein each of said exhaust gas flow regions includes an inlet and an outlet, wherein said recuperator core includes an inlet manifold communicating between said compressor and said cells, wherein said recuperator core also includes an outlet manifold communicating between said cells and said combustor, and wherein said recuperator housing includes:

an inlet manifold wrap portion covering an outer surface of said inlet manifold;

an outlet manifold wrap portion covering an outer surface of said outlet manifold;

a gas inlet side portion framing a side of said recuperator core around said inlets of said exhaust gas flow regions;

a gas outlet side portion framing a side of said recuperator core around said outlets of said exhaust gas flow regions;

an inlet plenum portion supported by said gas inlet side portion and communicating between said turbine and said inlets of said exhaust gas flow regions;

an exhaust plenum portion supported by said gas outlet side portion and communicating between said outlets of said exhaust gas flow regions and an exhaust duct of said engine; and top and bottom sheets substantially covering the top and bottom, respectively, of said recuperator core.

3. The engine of claim 2, wherein at least one of said inlet and exhaust plenum portions is integrally formed with at least one of said gas inlet and gas outlet side portions.

4. The engine of claim 2, wherein said inlet plenum portion is integrally formed with said gas inlet side portion, and wherein said exhaust plenum portion is detachably fastened to said gas outlet side portion.

5. The engine of claim 2, wherein said top and bottom sheets are fastened to respective top and bottom edges of said side portions.

6. The engine of claim 2, wherein said top and bottom sheets are metallurgically bonded to said inlet and outlet manifolds.

7. The engine of claim 2, further comprising a diffuser within said inlet plenum and communicating between said turbine and said inlet plenum.

8. The engine of claim 1, wherein said recuperator housing includes first and second side pieces and top and bottom sheets, said first and second side pieces being joined together at two seams, and together substantially surrounding all sides of said recuperator core, said top and bottom sheets substantially entirely covering the top and bottom of said recuperator core.

9. The engine of claim 8, further comprising an inlet plenum portion formed integrally with said first side piece and communicating between said turbine and said at least one exhaust gas flow region, and an exhaust plenum detachably fastened to said second piece and communicating between said at least one exhaust gas flow region and an exhaust duct of said engine.

10. The engine of claim 1, wherein said at least one compressed air flow region includes a plurality of compressed air flow regions defined by heat exchange cells, wherein said at least one exhaust gas flow region includes a plurality of exhaust gas flow regions defined between said cells, wherein said cells of said recuperator core are stacked to create inlet and discharge bellows-like manifolds and aligned matrix gas fins, said engine further comprising a superstructure surrounding said recuperator housing, said superstructure including a top plate above the recuperator housing, a bottom plate beneath the recuperator housing, and wherein the tie rod is part of said superstructure and includes a plurality of tie rods outside of the recuperator housing and interconnecting said top and bottom plates, wherein said superstructure resists expansion of said recuperator core and housing in said stackwise direction.

11. The microturbine engine of claim 10, further comprising insulation disposed between said recuperator housing and said tie rods, said insulation at least partially surrounding said housing and at least partially insulating said tie rods from heat issuing from said recuperator core and housing.

12. A recuperator assembly comprising:

a recuperator core including at least one compressed air flow region and at least one exhaust gas flow region, said recuperator core adapted to heat a fluid flowing through said compressed air flow region with heat from a fluid flowing through said exhaust gas flow region, the recuperator core expanding in response to the flow of compressed air and exhaust gas therethrough;

a recuperator housing substantially enclosing said recuperator core, said recuperator housing being intimate with said recuperator core such that said recuperator housing assumes substantially the same temperature as said recuperator core, wherein said recuperator housing is constructed of material having substantially the same coefficient of thermal expansion as that of said recuperator core to permit said housing to thermally expand and contract at substantially the same rate as said recuperator core; and a tie rod at least partially thermally isolated from the recuperator core and connected to the recuperator housing to inhibit expansion of the recuperator core.

13. The recuperator assembly of claim 12, wherein said at least one compressed air flow region includes a plurality of compressed air flow regions defined by heat exchange cells, wherein said at least one exhaust gas flow region includes a plurality of exhaust gas flow regions defined between said cells, wherein each of said gas flow regions includes an inlet and an outlet, wherein said recuperator core includes inlet and outlet manifolds communicating with said cells for the flow of compressed air into and out of said cells, and wherein said recuperator housing includes:

an inlet manifold wrap portion covering an outer surface of said inlet manifold;

an outlet manifold wrap portion covering an outer surface of said outlet manifold;

a gas inlet side portion framing a side of said recuperator core around said inlets of said gas flow regions;

a gas outlet side portion framing a side of said recuperator core around said outlets of said gas flow regions;

inlet and exhaust plenum portions supported by said gas inlet and gas outlet side portions, respectively, said inlet plenum portion communicating with said inlets to said gas flow regions to deliver a flow of exhaust gas thereto, and said outlet plenum portion communicating with said outlets of said gas flow regions to receive a flow of exhaust gas therefrom; and top and bottom sheets substantially covering the top and bottom, respectively, of said recuperator core.

14. The recuperator assembly of claim 13, wherein at least one of said inlet and exhaust plenum portions is integrally formed with at least one of said gas inlet and gas outlet side portions.

15. The recuperator assembly of claim 12, wherein said at least one compressed air flow region includes a plurality of compressed air flow regions defined by heat exchange cells, wherein said at least one exhaust gas flow region includes a plurality of exhaust gas flow regions defined between said cells, and wherein said cells of said recuperator core are stacked in a stackwise direction, said recuperator assembly further comprising a superstructure surrounding said recuperator housing, said superstructure including a top plate above the recuperator housing, a bottom plate beneath the recuperator housing, and wherein the tie rod further includes a plurality of tie rods outside of the recuperator housing and interconnecting said top and bottom plates, wherein said superstructure resists expansion of said recuperator core and housing is said stackwise direction.

16. The recuperator assembly of claim 15, further comprising insulation disposed between said recuperator housing and said tie rods, said insulation at least partially surrounding said housing and at least partially insulating said tie rods from heat issuing from said recuperator core and housing.

17. A recuperated microturbine engine comprising:

a recuperator core including a plurality of heat exchange cells and a plurality of exhaust gas flow regions between said heat exchange cells;

a compressor providing compressed air to said heat exchange cells;

a turbine providing hot exhaust gas to said exhaust gas flow regions to heat the compressed air in said cells;

a combustor receiving the heated compressed air from said cells and burning the preheated compressed air with a fuel to create products of combustion, wherein said turbine communicates with said combustor and operates in response to expansion of the products of combustion, and wherein said products of combustion exit said turbine as the hot exhaust gas;

a generator driven in response to operation of said turbine to generate electricity; and a recuperator housing including a first side piece, a second side piece, a top sheet, and a bottom sheet substantially enclosing said recuperator core, said recuperator housing being intimate with said recuperator core such that said recuperator housing assumes substantially the same temperature as said recuperator core, wherein said recuperator housing is constructed of material having substantially the same coefficient of thermal expansion as that of the recuperator core to permit said housing to thermally expand and contract at substantially the same rate as said recuperator core.

18. The engine of claim 17, further comprising an inlet plenum portion communicating between said turbine and said exhaust gas flow regions for the delivery of the exhaust gas to said exhaust gas flow regions, and an exhaust plenum portion communicating between said exhaust gas flow regions and an exhaust duct of said engine, wherein at least one of said inlet and outlet plenum portions is integrally formed with one of said side pieces.

19. The engine of claim 18, wherein said inlet plenum portion is integrally formed with said first side piece and wherein said outlet plenum portion is releasably mounted to said second side piece.

20. The engine of claim 18, further comprising a diffuser within said inlet plenum portion, and communicating between said turbine and said inlet plenum portion to recover dynamic pressure of exhaust gas prior to the exhaust gas entering said inlet plenum portion.

* * * * *